Nov. 21, 1961 T. G. FLOROS 3,009,637

LOCATING END OF FILE

Filed Oct. 30, 1959 2 Sheets-Sheet 1

INVENTOR
THEODORE G. FLOROS
BY [signature]
ATTORNEY

Nov. 21, 1961 T. G. FLOROS 3,009,637

LOCATING END OF FILE

Filed Oct. 30, 1959 2 Sheets-Sheet 2

TAPE RECORD

United States Patent Office 3,009,637

Patented Nov. 21, 1961

3,009,637
LOCATING END OF FILE

Theodore G. Floros, Poughkeepsie, N.Y., assignor to International Business Machines Corporation, New York, N.Y., a corporation of New York Filed Oct. 30, 1959, Ser. No. 849,919
10 Claims. (Cl. 235—61.11)

This invention relates to multi-unit magnetic tape data input and output systems for computers and data processing machines. More particularly, the invention relates to an improvement in such systems by providing the magnetic tape transports of the system with the ability to perform certain preparatory functions independently of the tape control unit to which all of the tape transports of the system are connected and to which they are responsive.

Conventional tape transports, in addition to reading from and writing upon magnetic tape, must be able to perform a number of preparatory functions which condition them to accept and act upon an anticipated computer command. Some of these functions, such as locating the end of a record, the end of a file of records, or indeed the end of the tape itself, require that the unit continue to scan its tape and recognize a specific character recorded on the tape indicating that the particular function has been completed.

It is obvious that during the performance of this type of preparatory function, the reading circuits of the unit can not also be used for reading useful data into a computing or processing system.

It is, therefore, a primary object of the invention to impart to tape transport units a self-executing ability for conditioning functions which heretofore required the use of the data reading and recognizing circuits and by so doing free the system circuits for the reading of useful data.

Large scale electronic computers and data processing systems frequently utilize a bank of magnetic tape reading and writing devices composed of a plurality of independent units as data input and output devices for the system. Whatever the number of tape units so employed, all the units are connected to and are under control of a tape control unit which serves as a common conduit for the transmission of data and control signals between the computing and processing circuits of the system and the tape units, and which monitors the performance of the several tape units in response to the system requirements.

Ordinarily, the tape units are connected to the tape control unit by common read and write busses which enable a selected tape unit to read input data into the system while another tape unit is writing generated data upon a tape. Any other function of the tape unit which requires the use of the read-write busses can not be performed while the reading and writing operations are being performed. As a result of this condition imposed on the system, certain preparatory functions in those tape units which are not reading or writing must be delayed until the read-write busses are free, or alternately, the read-write function must be delayed or interrupted until the preparatory function in a selected tape unit is completed.

The addition of individual input-output lines between each of the tape units and the tape control unit is not a complete solution to the dilemma. In this connection, it should be noted that not only are the additional data transmission lines involved, but also the attendant equipment required to properly receive and recognize a specific multi-bit signal configuration or a specific multi-bit character used to indicate the successful execution of a preparatory function in a selected tape unit. The magnitude of the problem can be appreciated by considering the difficulties introduced by skew during the reading of a multi-bit signal configuration or a specific character composed of a plurality of bits.

Skew is the condition which results when the several bits comprising a character are read from a tape in somewhat serial order when ideally all the bits comprising the character should be read simultaneously. Even magnetic tape records of low recording density, i.e., 500-bits per inch or less, are subject to skew and require skew registers if such data is to be transmitted properly. For such magnetic tape records, it has been customary to read the bits of a character on tape into a skew register (usually comprising a bistable trigger for each tape channel and attendant gating equipment), one character at a time, while the bit positions of the register are held open sufficiently long to permit the storage of an entire character despite the somewhat serial arrival therein of the bits constituting the character. The character bits thus aligned are then simultaneously read from the skew register.

Tapes having a recording density of more than 5000-bits per inch in a large number of parallel tracks on the tape are now visualized. At a recording density of 1000-bits per inch or more, the problem presented by skew becomes so troublesome that a relatively simple, single character skew register is no longer adequate to the problem, and much more complicated multi-character registers and their attendant control circuits are required.

It can be appreciated, therefore, that if a tape unit is to be controlled in such manner as to perform conditioning functions while another tape unit is reading and still another is writing, resort must be had to a technique which does not require that specific characters be read and identified by the normal reading circuits of the system. Consequently, this invention is predicated on the concept that conditioning or preparatory functions within one or more tape units can be performed under command of the computer or data processing system if the command is rendered self-executing such that it does not utilize the character transmission and recognition circuits of the control unit.

To the end that this may be accomplished, the invention contemplates the use of a simple circuit within the tape unit itself which is capable of easily recognizing, within wide tolerances, when the required function has been completed, and which then produces a signal which can be used to terminate the functional operation within the tape unit and also to manifest to the tape control unit, and through it to the computer or data processing system, that the function has been completed. The simplicity of the circuits herein stands in sharp contrast to the complexity of the circuits required to search for and recognize a specific character of multi-bit configuration which has heretofore been used for the same purpose. The invention in its various applications can be explained in connection with the operation of locating the end of a file of records on tape.

It may be stated that a specific object of the invention, therefore, is the provision of circuits within the tape transport units of a multi-unit system which are able to locate the end of a file of tape recorded records when the tape is moving either in the forward or in the backward direction, and entirely independent of the tape control unit to which the tape transports are connected. The stated objective will allow a selected tape transport to read tape and use the tape reading channels of the tape control unit, and at the same time one or more other tape transports may be performing an end of a file operation, or a similarly circumscribed function.

A practical embodiment of the invention is shown in the drawings forming a part hereof and the nature of the circuits involved can be ascertained by the following description which is in reference to the drawings.

In the drawings, like reference numerals indicate like parts, and:

Figure 3:
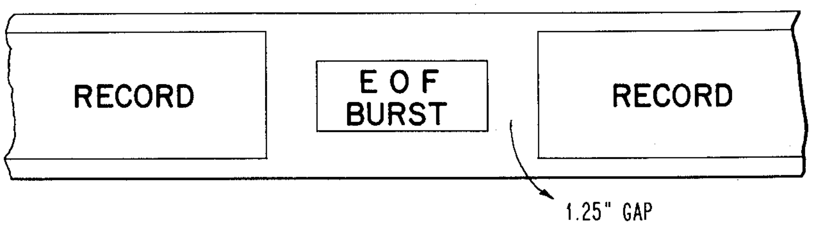
FIG. 3 represents a section of tape indicating the disposition of a pair of records thereon separated by an end of file signal.
Figure 5:
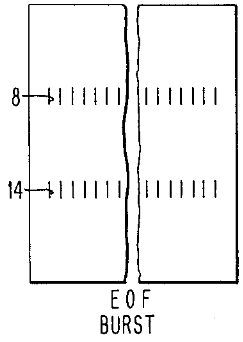
FIG. 5 is an enlarged representation of a section of tape containing an end of file signal.
Figure 4:
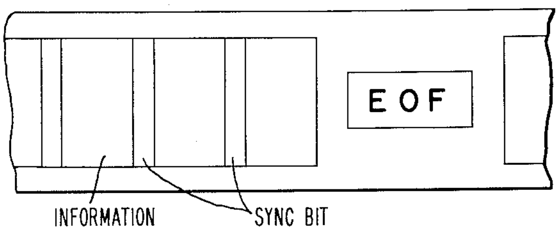
FIG. 4 is a more detailed representation of a tape section such as that in FIG. 3 showing the location of synchronizing signals in relation to blocks of data.

Details of the circuits that are involved will be most readily understood if the format of the magnetic record tape is first considered. For this purpose, reference should be had to FIGS. 3 through 5. The system giving rise to the present invention utilizes a relatively wide record tape which has recorded thereon 3000 bits per inch disposed in 22 parallel channels along the length of the tape. Therefore, each record may be considered as of an indeterminate succession of characters written in 22 tape channels. By reference to FIG. 4, it will be seen that the information that is recorded on the tape is interspersed with a synchronizing character which appears at regular intervals throughout the record. The synchronizing character in the present instance consists of a one written in each of the 22 channels of the tape and in certain instances this character may appear as frequently as every fifth character, for example, throughout the length of the record. Between each record, or file of records, there is recorded on the tape an end of file signal, the same being separated from the preceding and following records by a blank tape gap of 1.25 inches. The end of file signal, as seen in FIG. 5, is produced by a succession of bits recorded in at least one selected channel of the tape. To guard against all possible misadventure in the response to the end of file signal, two tape channels may be utilized for recording the signal, which channels are employed for this purpose is a matter of indifference herein, however, channels 8 and 14 have been selected for the purpose of illustration. The number of successive bits recorded in channels 8 and 14, one hundred in each channel for example, are great enough to produce a burst of signals in the sensing circuits, as distinguished from a single pulse which has been frequently employed heretofore as marking the end of the file.

The tape above described is processed in tape transport units capable of reading from and writing into the 22 channels thereof.

Figure 1:
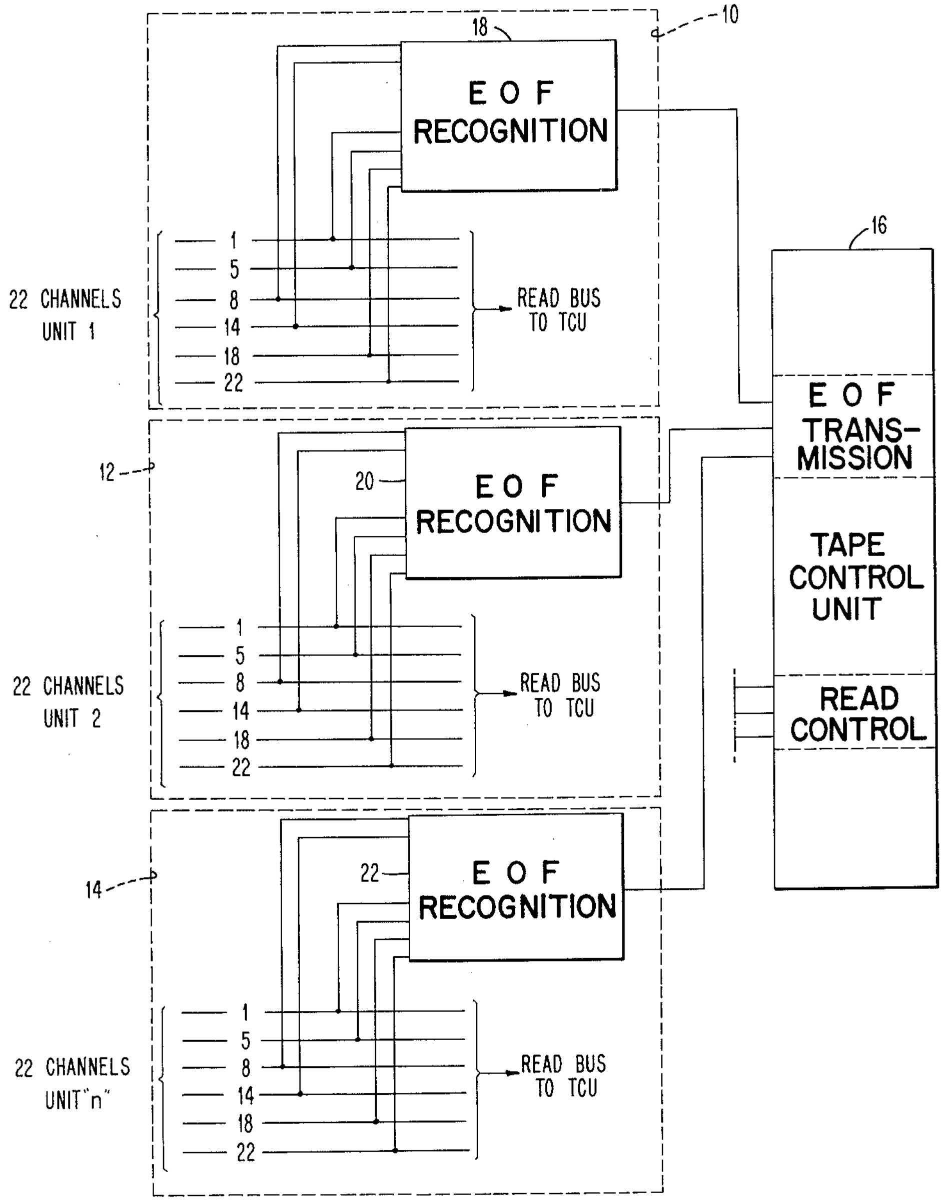
FIGURE 1 is a diagrammatic representation, principally in block form, of a magnetic tape input-output system.

FIG. 1 represents a tape input-output system for computers or data processing machines in which three tape transport units 10, 12 and 14 are shown to be connected to a tape control unit 16. Only those elements of the tape transport units and the tape control unit that are used in the invention herein are indicated in FIG. 1. In this connection, it should be pointed out that the read busses of each of the tape transport units are selectively connectible to a common read bus of the tape control unit, whereby a single tape unit, and one unit only, is able to transmit data read from tape at any given time.

Figure 2:
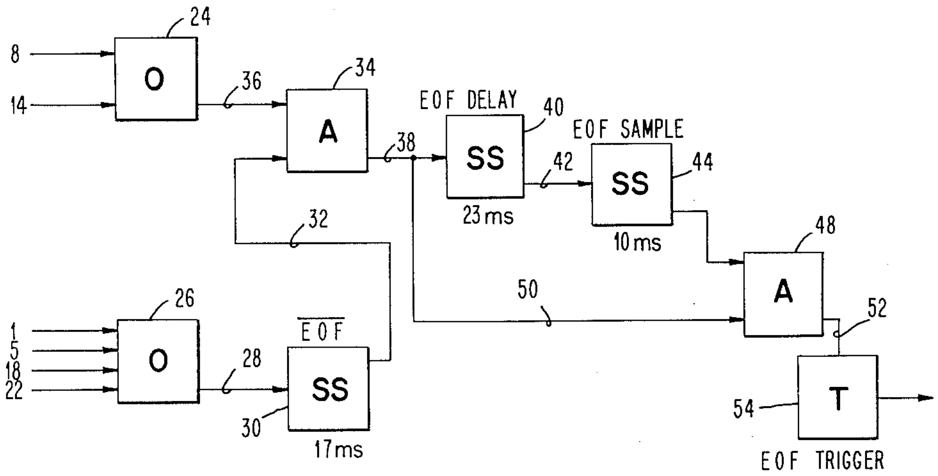
FIG. 2 is a block diagram of the end of file recognition circuits associated with each of the tape transports embodied in the system.

Each of the tape transport units has embodied therein the end of file recognition circuits with which this invention concerns itself and which circuits are shown in block form in FIG. 2. Thus, the tape transport unit 10 contains the end of file recognition circuits 18, the tape transport unit 12 contains the end of file recognition circuits 20 and the tape transport unit 14 contains the end of file recognition circuits 22. Three tape transport units are illustrated in FIG. 1, but it must be remembered that this number has been arbitrarily selected for purpose of illustration only, since most practical systems would include a greater number.

It can be further gathered from an examination of FIG. 1 that the reading channels of each transport which are connected to the end of recognition circuits are numbers 1, 5, 8, 14, 18 and 22. Since the remaining reading channels have no bearing on the invention herein, they have not been illustrated.

By reference to FIG. 2 of the drawings, it will be seen that the reading channels 8 and 14 are inputs to an OR circuit 24, while the channels 1, 5, 18 and 22 are inputs to an OR circuit 26. It has been pointed out that channels 8 and 14 are adapted to read the end of file signal on the tape. Just as channels 8 and 14 were arbitrarily selected for their stated purpose, so channels 1, 5, 18 and 22 have also been arbitrarily selected as an input to the OR circuit 26.

When the tape is moving in either the forward or backward direction, and as a normal record is being read, a one will appear on at least one of the four legs from channels 1, 5, 18 and 22 which are the inputs to the OR circuit 26. The configuration of the code which is employed is such that no matter what character is being read from the tape record, a bit will appear in at least one of the input channels to the OR circuit 26. The fact that the synchronizing signal, which appears with regularity throughout the tape record, has a bit in each of the 22 tape channels is also certain to energize the inputs to the OR circuit 26, although the synchronizing character was not designed for that purpose nor is it relied on to perform that function.

So long as there is an input on any of the legs of the OR circuit 26, the circuit will provide an output on its line 28 which is an input to an $\overline{\text{EOF}}$ singleshot multivibrator 30. This multivibrator has a period of 17 microseconds; consequently, the multivibrator 30 will be held in its on position so long as the reading of data is indicated on its input line 28 and 17 microseconds thereafter. When there is a failure of data as indicated by the fall of the signal on line 28, the multivibrator 30 will be turned off. At this point, its out-of-phase output 32 will rise and provide a positive input to an AND circuit 34 whose other input is the output of the OR circuit 24 by way of the connection 36. When, therefore, the multivibrator 30 indicates that no data is being read from the tape and as a result thereof provides a positive input to the AND circuit 34 and if at the same time an end of file signal on tape is dictated by the presence of bits recorded in channels 8 or 14 of the tape, the second input 36 of the AND circuit 34 will be energized such that an output signal is created on its output line 38. The circuit consisting of the OR circuits 24 and 26, the single shot multivibrator 30 and the AND circuit 34 is in itself sufficient to recognize an end of file and signal its presence. A more sophisticated circuit for the stated purpose will, however, include the remaining elements of FIG. 2, which are added to render its operation more certain.

It is quite possible that due to skew, tape imperfection or other causes, a signal may be detected in channels 8 and 14 of the tape which are, in fact, no part of the end of file signals. Persistence of signals in channels 8 and 14 can be recognized, however, as being caused only by the end of file burst. Therefore, the output of the AND circuit 34 is used as an input to an end of file delay single shot multivibrator 40, which has a period of 23 microseconds. If, therefore, the end of file signal is still being received from tape channels 8 and 14 when the end of file delay single shot 40 relaxes, the signal output on its line 42 will, on its negative shift, turn on an end of file sample single shot multivibrator 44 which has a period of 10 microseconds. During this period, therefore, an end of file sampling pulse is transmitted along a connection 46 to the input side of an AND circuit 48. The output of the AND circuit 34, which is, as stated, an input to the end of file delay single shot 40, is also routed along a line 50 which is the second input to the AND circuit 48 and if, therefore, the output of the AND circuit 34 is up as an indication that no valid records are being sensed but that there is a continuous sensing of the end of file signal in channels 8 and 14, the second input to the AND circuit 48 will be positive and, therefore, the AND circuit 48 will emit a signal on its output 52. This signal turns on an end of file trigger 54 in the tape unit, which, as shown in FIG. 1, is connected to the end of file transmission circuits in the tape control unit 16 where its signal may be utilized by the computer to determine subsequent operations. The signal may also be employed to stop the tape drive after the end of file has been located.

It can be seen from the foregoing that the invention provides an extremely simple circuit for locating various record end areas of a magnetic record tape, and that its paramount characteristic is its simplicity and unique operating reliability. Use of the invention in multi-transport tape systems will render such systems much more versatile at negligible cost of additional components.

While the invention has been described in connection with end of file operations, it is to be understood that the invention is equally useful in locating either end of a record, any inter-record gaps, or, in fact, any part of a magnetic tape in which the characteristic signal burst is recorded.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. In a magnetic tape control system adapted to read a magnetic tape having spaced blocks of data recorded thereon in a plurality of longitudinal channels and having recorded between such blocks of data a substantial number of successive signals in a selected channel of such tape; means for sensing the presence of data bits in a plurality of tape channels other than in said selected channel, means responsive to said sensing means for producing a signal upon sensing the absence of data on a tape being read, means for sensing the presence of signals in said selected channel, means responsive to said last named means for producing a signal upon sensing the presence of signals in said selected channel, a coincidence circuit having inputs for both of said signals, and an output for said coincidence circuit for transmitting a signal when both said aforesaid signals are impressed on said coincidence circuit.

2. In a magnetic tape control system adapted to read a magnetic tape having spaced blocks of data recorded thereon in a plurality of longitudinal channels and having recorded between such blocks of data a substantial number of successive signals in one or more selected channels of such tape; means for sensing the presence of data bits in a plurality of tape channels other than in said selected channels, means responsive to said sensing means for producing a signal upon sensing the absence of data on a tape being read, means for sensing the presence of signals in said selected channels, means responsive to said last named means for producing a signal upon sensing the presence of signals in said selected channels, a coincidence circuit having inputs for both of said signals, and an output for said coincidence circuit for transmitting a signal when both said aforesaid signals are impressed on said coincidence circuit.

3. In a magnetic tape control system adapted to read a magnetic tape having spaced blocks of data recorded thereon in a plurality of longitudinal channels and having recorded between such blocks of data a substantial number of successive signals in a pair of selected channels of such tape; means for sensing the presence of data bits in a plurality of tape channels other than in said pair of selected channels, means responsive to said sensing means for producing a signal upon sensing the absence of data on a tape being read, means for sensing the presence of signals in said pair of selected channels, means responsive to said last named means for producing a signal upon sensing the presence of signals in said pair of selected channels, a coincidence circuit having inputs for both of said signals, and an output for said coincidence circuit for transmitting a signal when both said aforesaid signals are impressed on said coincidence circuit.

4. In a magnetic tape control system adapted to read a magnetic tape having spaced blocks of data recorded thereon in a plurality of longitudinal channels and having recorded between such blocks of data a substantial number of successive signals in one or more selected channels of such tape; means including a trigger circuit for sensing the presence of data bits in a plurality of tape channels other than in said selected channels, means responsive to said sensing means for producing a signal upon sensing the absence of data on a tape being read, means for sensing the presence of signals in said selected channels, means responsive to said last named means for producing a signal upon sensing the presence of signals in said selected channels, a coincidence circuit having inputs for both of said signals, and an output for said coincidence circuit for transmitting a signal when both said aforesaid signals are impressed on said coincidence circuit.

5. In a magnetic tape control system adapted to read a magnetic tape having spaced blocks of data recorded thereon in a plurality of longitudinal channels and having recorded between such blocks of data a substantial number of successive signals in one or more selected channels of such tape; means for sensing the presence of data bits in a plurality of tape channels other than in said selected channels, means responsive to said sensing means for producing a signal upon sensing the absence of data on a tape being read, means for sensing the presence of signals in said selected channels, means responsive to said last named means for producing a signal upon sensing the presence of signals in said selected channels, a concidence circuit having inputs for both of said signals, an output for said coincidence circuit for transmitting a signal when both said aforesaid signals are impressed on said coincidence circuit, and a signal delay circuit connected to said last named output conditioned to emit a signal upon persistence of a signal on said last named output.

6. In a magnetic tape control system adapted to read a magnetic tape having spaced blocks of data recorded thereon in a plurality of longitudinal channels and having recorded between such blocks of data a substantial number of successive signals in a pair of more selected channels of such tape; means including a trigger circuit for sensing the presence of data bits in a plurality of tape channels other than in said pair of selected channels, means responsive to said sensing means for producing a signal upon sensing the absence of data on a tape being read, means for sensing the presence of signals in said pair of selected channels, means responsive to said last named means for producing a signal upon sensing the presence of signals in said pair of selected channels, a coincidence circuit having inputs for both of said signals, an output for said coincidence circuit for transmitting a signal when both said aforesaid signals are impressed on said coincidence circuit, and a signal delay circuit connected to said last named output conditioned to emit a signal upon persistence of a signal on said last named output.

7. In a magnetic tape control system adapted to read a magnetic tape having spaced blocks of data recorded thereon in a plurality of longitudinal channels and having recorded between such blocks of data a substantial number of successive signals in a selected channel of such tape; means for sensing the presence of data bits in a plurality of tape channels other than said selected channel, means responsive to said sensing means for producing a signal upon sensing the absence of data on a tape being read, means for sensing the presence of signals in said selected channel, means responsive to said last named means for producing a signal upon sensing the presence of signals in said selected channel, a first coincidence circuit having inputs for both of said signals, an output for said first coincidence circuit for transmitting a signal when both said aforesaid signals are impressed on said first coincidence circuit, a second coincidence circuit having an input connected to the output of said first coincidence circuit, a signal delay circuit also connected to the output of said first coincidence circuit and having a signal output therefrom only upon the persistence of a signal upon its input, a connection between the output of said signal delay circuit constituting an input to said second coincidence circuit, and an output circuit from said second coincidence circuit for transmitting a signal when both the inputs thereto have a signal impressed thereon.

8. In a magnetic tape control system adapted to read a magnetic tape having spaced blocks of data recorded thereon in a plurality of longitudinal channels and having recorded between such blocks of data a substantial number of successive signals in one or more selected channels of such tape; means for sensing the presence of data bits in a plurality of tape channels other than said selected channels, means responsive to said sensing means for producing a signal upon sensing the absence of data on a tape being read, means for sensing the presence of signals in said selected channels, means responsive to said last named means for producing a signal upon sensing the presence of signals in said selected channels, a first coincidence circuit having inputs for both of said signals, an output for said first coincidence circuit for transmitting a signal when both said aforesaid signals are impressed on said first coincidence circuit, a second coincidence circuit having an input connected to the output of said first coincidence circuit, a signal delay circuit also connected to the output of said first coincidence circuit and having a signal output therefrom only upon the persistence of a signal upon its input, a connection between the output of said signal delay circuit constituting an input to said coincidence circuit, and an output circuit from said second coincidence circuit for transmitting a signal when both the inputs thereto have a signal impressed thereon.

9. In a magnetic tape control system adapted to read a magnetic tape having spaced blocks of data recorded thereon in a plurality of longitudinal channels and having recorded between such blocks of data a substantial number of successive signals in one or more selected channels of such tape; means for sensing the presence of data bits in a plurality of tape channels other than said selected channels, means including a trigger circuit responsive to said sensing means for producing a signal upon sensing the absence of data on a tape being read, means for sensing the presence of signals in said selected channels, means responsive to said last named means for producing a signal upon sensing the presence of signals in said selected channels, a first coincidence circuit having inputs for both of said signals, and output for said first coincidence circuit for transmitting a signal when both said aforesaid signals are impressed on said first coincidence circuit, a second coincidence circuit having an input connected to the output of said first coincidence circuit, a signal delay circuit comprising a pair of trigger circuits connected for sequential operation also connected to the output of said first coincidence circuit and having a signal output therefrom only upon the persistence of a signal upon its input, a connection between the output of said signal delay circuit constituting an input to said second coincidence circuit, and an output circuit from said second coincidence circuit for transmitting a signal when both the inputs thereto have a signal impressed thereon.

10. In a magnetic tape control system adapted to read a magnetic tape having spaced blocks of data recorded thereon in a plurality of longitudinal channels and having recorded between such blocks of data a substantial number of successive signals in a pair of more selected channels of such tape; means including a trigger circuit for sensing the presence of data bits in a plurality of tape channels other than said pair of selected channels, means responsive to said sensing means for producing a signal upon sensing the absence of data on a tape being read, means for sensing the presence of signals in said pair of selected channels, means responsive to said last named means for producing a signal upon sensing the presence of signals in said pair of selected channels, a first coincidence circuit having inputs for both of said signals, an output for said first coincidence circuit for transmitting a signal when both said aforesaid signals are impressed on said first coincidence circuit, a second coincidence circuit having an input connected to the output of said first coincidence circuit, a signal delay circuit comprising a pair of trigger circuits connected for sequential operation also connected to the output of said first coincidence circuit and having a signal output therefrom only upon the persistence of a signal upon its input, a connection between the output of said signal delay circuit constituting an input to said second coincidence circuit, and an output circuit from said second coincidence circuit for transmitting a signal when both the inputs thereto have a signal impressed thereon.

No references cited.